United States Patent Office 3,109,772
Patented Nov. 5, 1963

3,109,772
5-MERCAPTO-4-PHENYL-1,2-DITHIOLE-3-THIONE AND FUNGICIDAL COMPOSITIONS CONTAINING THE SAME
Lawrence E. Carosino, Wilmington, Del., assignor to Hercules Powder Company, Wilmington, Del., a corporation of Delaware
No Drawing. Filed May 31, 1961, Ser. No. 113,658
4 Claims. (Cl. 167—33)

This invention relates to 5-mercapto-4-phenyl-1,2-dithiole-3-thione and to fungicidal compositions containing the same.

In accordance with the present invention 5-mercapto-4-phenyl-1,2-dithiole-3-thione in a dispersed state has been found to have excellent fungicidal properties and to be particularly useful for the protection of vegetation from fungi normally growing thereon.

5-mercapto-4-phenyl-1,2-dithiole-3-thione is readily prepared by reacting 5-chloro-4-phenyl-1,2-dithiole-3-one with $P_2S_5$ and hydrolyzing the intermediate phosphorus compound. This method of preparation was used in Example 1 because the product contained a high concentration of 5-mercapto-4-phenyl-1,2-dithiole-3-thione which is particularly active against powdery mildew and very little 5-mercapto-4-phenyl-1,2-dithiole-3-one which is ineffective against powdery mildew. The preparation of 5-chloro-4-phenyl-1,2-dithiole-3-one is described in U.S. 3,031,372 granted to Karl Brack.

The method of preparing 5-mercapto-4-phenyl-1,2-dithiole-3-thione as well as the manner of using it in fungicidal compositions is illustrated in the following example in which all parts and percentages are by weight.

Example 1

To a mixture of 222 parts phosphorus pentasulfide in 850 parts toluene was added 110 parts 5-chloro-4-phenyl-1,2-dithiole-3-one. The temperature was raised to 110–112° C., and the mixture was refluxed for 1 hour. Then 110 parts more 5-chloro-4-phenyl-1,2-dithiole-3-one was added in two equal increments with one hour's refluxing after each addition. The reaction was then completed by refluxing for 3 hours longer. The reaction mixture was a pasty slurry which yielded an orange-brown solid on filtration. This solid, phosphorus-containing product, after drying free of solvent, amounted to 413 parts. It was hydrolyzed by adding it to 16 parts methanol, whereby some $H_2S$ was evolved, and then heating to 70° C. while 248 parts potassium hydroxide in 500 parts water was added dropwise over about a one-hour period. The resulting dark solution was refluxed for 3 hours, diluted with 1600 parts cold water and acidified with about 400 parts 38% concentrated hydrochloric acid in amount sufficient to produce a definite acidity. During the acidification, an orange-brown crystalline product separated, and this was removed by filtration. It was triturated three times with 500 parts chloroform, in which dark-colored impurities dissolved, with filtration between triturations. The resulting purified crystalline 5-mercapto-4-phenyl-1,2-dithiole-3-thione amounted to 230 parts. It melted at 148–153° C. and contained by analysis 52.6% S (calculated for $C_9H_6S_4$: 52.9% S).

Fungicidal tests were made with several fungi and particularly with powdery mildew on squash and green bean host plants growing in individual containers in the greenhouse. Compositions of 0.4 part 5-mercapto-4-phenyl-1,2-dithiole-3-thione, 0.8 part benzene, and 0.4 part Tween 20 (surface-active dispersing agent) were made up and diluted to 200 parts with water to form an emulsion of 0.2% by weight of 5-mercapto-4-phenyl-1,2-dithiole-3-thione. More dilute emulsions were prepared by further dilution with water. Both infected plants and healthy plants were exposed under a standardized spraying technique with the emulsions so prepared, and the healthy plants were then used as controls and for tests as to the protective merits of the fungicide by subsequent exposure to spores of pathogenic powdery mildew. The leaves of the plants were measured for infected area and uninfected area and rated from 0–11 according to percent of the area infected from 0 to 100%. The phytotoxic effect on the plant was also noted and recorded on a similar scale. The number of colonies of spores on treated and untreated leaves was also counted and related in terms of disease index which is the count of the former, times 100, and divided by the count of the latter. Pure 5-mercapto-4-phenyl-1,2-dithiole-3-thione at 0.2% concentration resulted in a disease index of 1.9 while at 0.1% concentration the disease index was 12.0. The corresponding phytotoxicity at these concentrations was 5% and 1% respectively.

Example 2

5-mercapto-4-phenyl-1,2-dithiole-3-thione was also made by the reaction of 0.25 mole 3,3,5-trichloro-4-phenyl-1,2-dithiole with 1 mole water-free sodium hydrogen sulfide at 0–15° C. The 3,3,5-trichloro-4-phenyl-1,2-dithiole was made by chlorination of 4-phenyl-1,2-dithiole-3-thione (U.S. Serial No. 794,839 of Karl Brack), and the sodium hydrogen sulfide was made by adding $H_2S$ to anhydrous sodium methoxide in anhydrous benzene. The 3,3,5-trichloro-4-phenyl-1,2-dithiole was added in small portions to the cooled benzene solution of sodium hydrogen sulfide, and the temperature was then gradually raised to 80° C. where it was held for 1 hour. The solids which separated were recovered by filtration, dissolved in water and acidified with 20% hydrochloric acid to precipitate the product. The product so obtained was filtered and dried. The yield was 20 parts brown solid, analysis: 51.3% S (calculated for $C_9H_6S_4$, 52.9% S). This product contained 5-mercapto-4-phenyl-1,2-dithiole-3-one which is fungicidally inactive and was thus lower in activity than the product of Example 1.

The 5-mercapto-4-phenyl-1,2-dithiole-3-thione of this invention is an excellent latent fungicide, i.e., when properly dispersed and applied to areas on which fungi normally grow, and the compound inhibits the growth of fungi. Fungi exposed to this compound become inactive and for practical purposes the inactivity appears to be permanent.

The compound of this invention is applied to substances on which fungi normally grow in a dispersed state, and to this end are normally used with a dispersing agent which may be a solid, liquid or a gas which dilutes and disperses the compound. It is preferably used in aqueous or dust dispersions, and a concentrated composition for dilution will thus comprise essentially the compound in admixture with a surface-active agent. The dusts used as dispersants are in themselves inorganic, solid, surface-active agents, and such dusts may be used along with water to form aqueous dispersions. Moreover, the surface-active agent may be any of the well-known organic anionic, cationic, or nonionic surface-active agents commonly used in the fungicide art for making aqueous dispersions of water-insoluble solids or liquids. Examples of inorganic surface-active agents are: talc, bentonite, sulfur, pumice, silica, fuller's earth, diatomaceous earth, kaolin, attapulgite, mica, and similar finely divided, inorganic solids. Examples of organic surface-active agents are: fatty acid soaps, alkyl sulfonates, alkyl sulfates, sulfated ethers of long-chain aliphatic compounds, sulfonated alkyl esters, sulfated glycol esters, alkylated aryl sulfonates and alkyl sulfosuccinates. Examples of nonionic surface-active agents which may be used are monoethers of polyglycols with long-chain fatty alcohols, e.g., polyoxyethylene compounds such as $C_{18}H_{35}-(OC_2H_4)_nOH$ where $n=10$ to 20, monofatty acid esters of polyethylene glycol such as $C_{17}H_{33}CO(OC_2H_4)_nOH$ where $n$ is 10 to 20, monoethers of polyglycols and alkylated phenols having 10 to 20 polyoxyethylene groups, monoesters of fatty acids and polyhydric alcohols, and polyglycol ethers of polyhydric alcohols and fatty acid esters thereof. Cationic surface-active agents that may be used in the fungicide compositions include quaternary ammonium salts in which the nitrogen is an aliphatic group of at least 8 carbon atoms, e.g., lauryl pyridinium chloride, amines, amides and diamines having an aliphatic group of at least 8 carbons and their acid salts.

What I claim and desire to protect by Letters Patent is:

1. As a compound with latent fungicidal activity 5-mercapto-4-phenyl-1,2-dithiole-3-thione.

2. The method of inhibiting fungus growth which comprises exposing fungi to a fungitoxic amount of a dispersion of 5-mercapto-4-phenyl-1,2-dithiole-3-thione.

3. A fungicide composition consisting essentially of the compound of claim 1 in admixture with a surface-active agent.

4. A fungicide composition consisting essentially of the compound of claim 1 in fungicidally active amount and a fungicide carrier in an amount sufficient to be effective as a dispersing aid therefor.

References Cited in the file of this patent

UNITED STATES PATENTS

| | | |
|---|---|---|
| 2,861,919 | Gilbert | Nov. 25, 1958 |
| 2,905,696 | Fields | Sept. 22, 1959 |
| 2,946,720 | Lewis | July 26, 1960 |
| 2,995,569 | Hamilton et al. | Aug. 8, 1961 |

UNITED STATES PATENT OFFICE
CERTIFICATE OF CORRECTION

Patent No. 3,109,772                      November 5, 1963

Lawrence E. Carosino

It is hereby certified that error appears in the above numbered patent requiring correction and that the said Letters Patent should read as corrected below.

Column 1, line 48, for "16 parts" read -- 1600 parts --.

Signed and sealed this 28th day of April 1964.

(SEAL)
Attest:

ERNEST W. SWIDER                      EDWARD J. BRENNER

Attesting Officer                       Commissioner of Patents